(12) United States Patent
Dimas et al.

(10) Patent No.: US 6,512,999 B1
(45) Date of Patent: Jan. 28, 2003

(54) APPARATUS FOR AND METHOD OF SIMULATING TURBULENCE

(75) Inventors: Athanassios Dimas, Rockville, MD (US); Isaac Lottati, Potomac, MD (US); Peter Bernard, Silver Spring, MD (US); James Collins, Sykesville, MD (US); James C. Geiger, Rockville, MD (US)

(73) Assignee: Vorcat, Inc., Rockville, MD (US)

( * ) Notice: Subject to any disclaimer, the term of this patent is extended or adjusted under 35 U.S.C. 154(b) by 0 days.

(21) Appl. No.: 09/401,184

(22) Filed: Sep. 23, 1999

Related U.S. Application Data

(60) Provisional application No. 60/140,800, filed on Jun. 25, 1999.

(51) Int. Cl.$^7$ .................................................. G06F 7/48
(52) U.S. Cl. ............................................. 703/9; 703/2
(58) Field of Search ...................... 703/2, 6, 9; 73/147; 702/50

(56) References Cited

U.S. PATENT DOCUMENTS

| | | | |
|---|---|---|---|
| 5,544,524 A | * 8/1996 | Huyer et al. | 73/147 |
| 5,600,060 A | * 2/1997 | Grant | 73/147 |
| 5,912,823 A | * 6/1999 | Grant | 703/6 |

OTHER PUBLICATIONS

Silver et al., "Tracking and Visualizing Turbulent 3d Features", IEEE Transactions on Visualization and Compuer Graphics, vol. 3, Issue 2, pp. 129–141, Jun. 1997.*

Banks et al., "Tracking a Turbulent Spot in an Immersive Environment", Proc. 1995 Symposium on Interactive 3D Graphics, pp. 171–172, Apr. 1995.*

Sadarjoen et al., "Selective Visualization of Vorticies in Hydrodynamic Flows", Proc. Conference on Visualization '98, pp. 419–422, Oct. 1998.*

Banks et al., "Vortex Tubes in Turbulent Flows: Idenfication, Representation and Reconstruction", Proc. Conference on Visualization '94, pp. 132–139, Oct. 1994.*

Banks et al., "A Predictor–corrector Technique for Visualizing Unsteady Flow", IEEE Transactions on Visualization and Computer Graphics, vol. 1, Issue 2, pp. 151–163, Jun. 1995.*

Silver et al., "Volume Tracking", Proceedings of the Conference on Visualization '96, pp. 157–164, Oct. 1996.*

* cited by examiner

*Primary Examiner*—Russell Frejd
(74) *Attorney, Agent, or Firm*—Dickstein Shapiro Morin & Oshinsky LLP

(57) ABSTRACT

In accordance with a preferred embodiment of the invention, a novel apparatus for and method of simulating physical processes such as fluid flow is provided. Fluid flow near a boundary or wall of an object is represented by a collection of vortex sheet layers. The layers are composed of a grid or mesh of one or more geometrically shaped space filling elements. In the preferred embodiment, the space filling elements take on a triangular shape. An Eulerian approach is employed for the vortex sheets, where a finite-volume scheme is used on the prismatic grid formed by the vortex sheet layers. A Lagrangian approach is employed for the vortical elements (e.g., vortex tubes or filaments) found in the remainder of the flow domain. To reduce the computational time, a hairpin removal scheme is employed to reduce the number of vortex filaments, and a Fast Multipole Method (FMM), preferably implemented using parallel processing techniques, reduces the computation of the velocity field.

7 Claims, 9 Drawing Sheets

BLUE  GREEN  YELLOW  RED

APPARATUS FOR AND METHOD OF SIMULATING TURBULENCE

This application is derived from Provisional Application No. 60/140,800 filed Jun. 25, 1999, which is incorporated herein by reference in its entirety.

Government Interest: This invention was made with government support under Grant No. DE-FG02-97ER82413 awarded by the Department of Energy. The government has certain rights in the invention.

BACKGROUND OF THE INVENTION

For over a century there has been the desire and need to study and predict physical processes such as fluid flow. Understanding the flow past an object (e.g., automobile, airplane wing, etc.) requires an understanding of the turbulence introduced as a result of the relative motion of the fluid and the object. There have been many attempts in the past to gain a better understanding of fluid flow and turbulence.

U.S. Pat. No. 3,787,874, for example, disclosed a method of making boundary layer flow conditions visible by a reactive layer of a colored chemical indicator to the surface of an object exposed to fluid flow. U.S. Pat. No. 4,727,751 disclosed a mechanical sensor for determining cross flow vorticity characteristics. The sensors contained hot-film sensor elements which operate as a constant temperature anemometer circuit to detect heat transfer rate changes.

The direct implementation of vortex methods, however, presents at least two problems that have limited their appeal. First, vortex methods indiscriminately track the dynamics of individual vortical structures as they stretch and fold. As a result, the number of vortices can grow to impractical levels. Second, the computational time associated with the nominally O ($N_v^2$) operations implicit in the Bio Savart law evaluation of velocities due to $N_v$ vortex lemeents, an essential aspect of their formulation and a source of their unique advantages, can grow beyond reasonable levels for engineering use. An additional concern, which pertains to the traditional random vortex method, is the noise introduced by a random walk diffiusion model: unless a very fine coverage of vortex elements is employed, this can easily exceed the levels found in real turbulent flows.

Computer modeling techniques that permit the simulation and analysis of fluid flow using computer modeling is much more attractive because it eliminates the need for physical models and repetitive testing. Some computer simulations attempted to model the fluid flow by covering the entire fluid flow domain with a large mesh or grid. Such grid-based simulations were inefficient and lacking in accuracy to the real physics in fluid flows, particularly those with high Reynolds number turbulence.

With the breakthrough work of Alexandre J. Chorin, University of California in Berkeley, however, a tremendous advantage in understanding and predicting fluid flow was attained using Chorin's vortex method. According to the vortex method, the vorticity of fluid was used to better understand the basis for fluid flow. In the vortex method a flow field is represented by a collection of convecting and diffusing vortex elements. This method has negligible if any numerical diffusion so that high Reynolds number turbulence effects can be represented with high numerical accuracy and fidelity. The method is grid-free so that it can be easily applied to engineering flows in complex geometries. Moreover, the method is naturally adaptive since the computational elements occupy only the relatively small support of the flow field where the vorticity is significant.

The direct implementation of vortex methods, however, presents at least two problems that have limited their appeal. First, vortex methods indiscriminately track the dynamics of individual vortical structures as they stretch and fold, as a result, the number of vortices can grow to impractical levels. Second, the computational time associated with the nominally O ($N_v^2$) operations implicit in the Bio Savart law evaluation of velocities due to $N_v$ vortex elements, an essential aspect of their formulation and a source of their unique advantages, can grow beyond reasonable levels for engineering use. An additional concern, which pertains to the traditional random vortex method, is the noise introduced by a random walk diffulsion model: unless a very fine coverage of vortex elements is employed, this can easily exceed the levels found in real turbulent flows.

The options for taking account the essential process of vortex stretching over a field of computational elements is a strong function of the particular types of vortices used in the numerical algorithm. The commonly employed vortex blobs, i.e., independently evolving three-dimensional regions of high vorticity concentration, have many desirable properties in the computation of laminar flow solutions, yet are a source of lingering problems when turbulent conditions are encountered. In particular, they tend to be associated with numerical instabilities arising, apparently, when the non-linear coupling between blob strength and stretching causes the former to grow without bound. A common tendency has been to "switch off" the vortex stretching effect to prevent instability, even though this eliminates one of the most fundamental processes of turbulent flow.

New vorticity most often appears in viscous flows at solid boundaries as a natural consequence of the no slip condition, by which fluid in contact with a solid body must move with the same velocity as the solid. Under turbulent conditions, the regions where new vortices appear tend to be relatively thin boundary layers with very high levels of vorticity. The challenge for a vortex method is to efficiently represent such large thin regions with vortex elements while satisfying the no slip condition and generating the proper amount of new vorticity. Typical vortex elements such as blobs and tubes are poorly constructed to represent thin, flat regions, and vortex methods which attempt to use such elements to satisfy no slip tend to be inefficient: large numbers of overlapping elements are needed to counter the inherent three-dimensionality of the velocity field they produce.

SUMMARY OF THE INVENTION

In accordance with a preferred embodiment of the invention, a novel apparatus for and method of simulating physical processes such as fluid flow is provided. Fluid flow near a boundary or wall of an object is represented by a collection of vortex sheet layers. The layers are composed of a grid or mesh of one or more geometrically shaped space filling elements. In the preferred embodiment, the space filling elements take on a triangular shape, preferably a triangular prismatic shape. An Eulerian approach is employed for the vortex sheets, where a finite-volume scheme is used on the prismatic grid formed by the vortex sheet layers. A Lagrangian approach is employed for the vortical elements (e.g., vortex tubes or filaments) found in the remainder of the flow domain.

To reduce the computational time, a hairpin removal scheme is employed to reduce the number of vortex filaments, and a Fast Multipole Method (FMM), preferably implemented using parallel processing techniques, reduces the computation of the velocity field.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

The invention will be described in detail with reference to the preferred embodiments illustrated in FIGS. 1–9b. The invention is described herein in its preferred application to the simulation of vortex elements in fluid flow about a solid object. However, the invention may be applicable to any type or configuration of computing system, method or algorithm used to simulate, model, analyze, or otherwise predict physical processes that encounter the same or similar problems overcome by the invention described herein.

Figure 1:
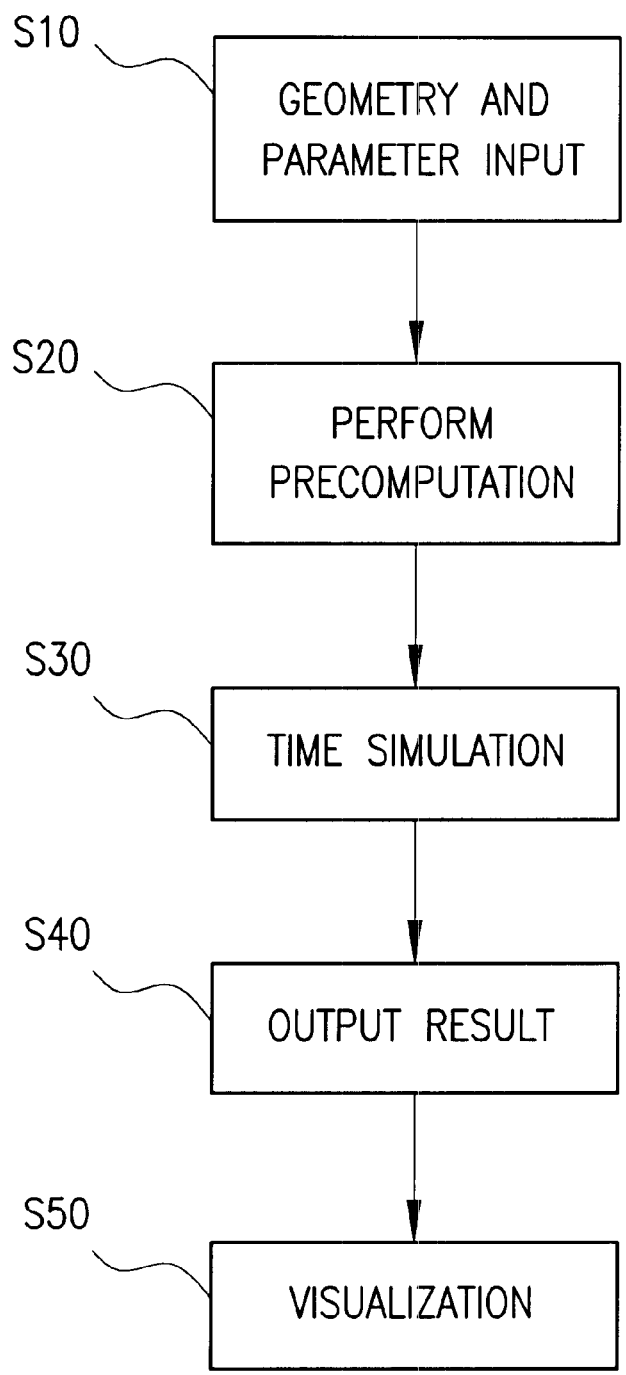
FIG. 1 is a flow chart illustrating the process flow of a preferred embodiment of the invention.

A physical process can be accurately and efficiently simulated, modeled, analyzed, or otherwise predicted in accordance with a preferred embodiment of the invention by implementing the methodology or process flow depicted in FIG. 1. The process is initiated in step S10 by the input of a set of parameters indicative of the physical process to be evaluated. (For the purposes of illustration, the physical process specifically described herein in connection with the preferred embodiment will be fluid flow.) As will be described below, the initial parameters may address, for example, the number of vortex sheet layers defined over the surfaces of the object, the number of field points within a subdomain in a vortex tube, and other data directed to the resolution, efficiency, complexity and other criteria of the computation or flow environment necessary to properly evaluate the subject process.

Step S10 preferably includes the process of modeling or defining the geometry of all the solid surfaces of the object. In accordance with a preferred embodiment of the invention, the object's geometry is defined as a surface grid or mesh utilizing one or more different space filling shapes. In the preferred embodiment, the space filling shape is in the form of a plurality of triangular elements to represent the solid surfaces in three-dimensions. Preferably, the surface mesh is laid out, however, one or more refining or improving steps may be added to increase the accuracy of the surface mesh.

Figure 4:
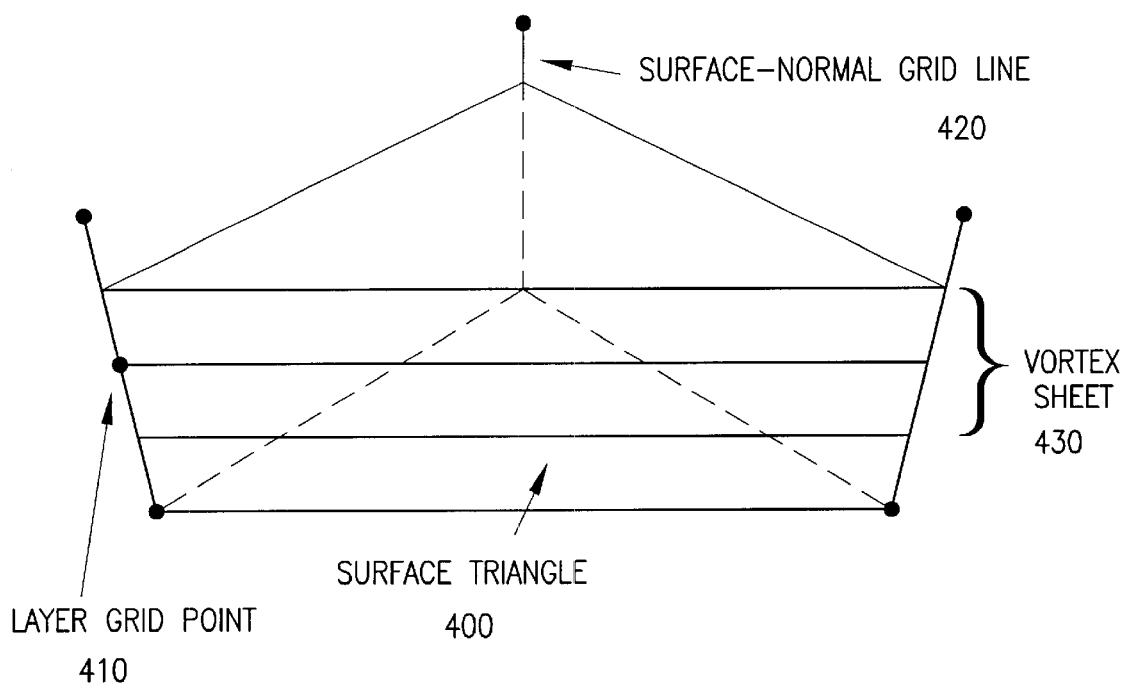
FIG. 4 illustrates a plurality of vortex sheet layers defined above the surface of an object in accordance with a preferred embodiment of the invention.

In accordance with a preferred embodiment of the invention, the flow near the boundary or wall of the object is modeled with a series of vortex sheets. Preferably, the vortex sheets are organized by two (or any number of) fluid layers. In the preferred embodiment, a layer grid of the vortex sheets 430 is constructed by taking the wall-normal lines 420 at the vertices of the surface triangular elements 400, defining the grid points on these lines 410, and connecting them so as to generate a prismatic grid, as shown in FIG. 4.

In the preferred embodiment, the layers of vortex sheets are of finite thickness around the boundary of the object. The precise thickness and the exact number of layers used are some of the parameters input in step S10, as they tend to change with the complexity of the object under study or with the desired level (or order) of accuracy of the computation. For example, when used in the design of an automobile, the input may specify 10 layers making up the vortex sheet with a total thickness of 1% of the total length of the automobile. Preferably, the layers are of uniform thickness. (In the alternative, the thickness of the layers may be varied.) In any event, the layers remain fixed overlaying the surfaces of the object.

Once the geometry and parameter inputs are made in step S10, the process flow proceeds to step S20 (FIG. 1) where initial computations are made (and any necessary files restarted) prior to the time simulation of step S30. Thus, although the vortex method used to simulate turbulence in the fluid flow marches on in time, there is an initial state of the fluid flow which must be established in step S20.

Figure 2:
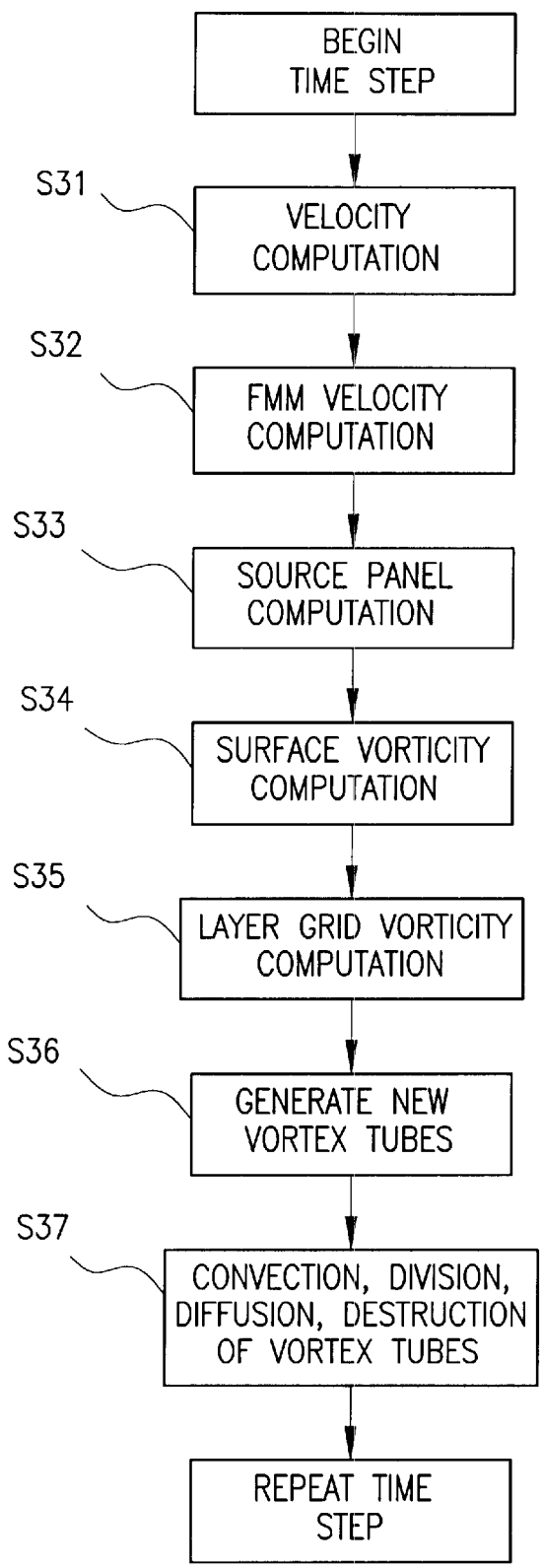
FIG. 2 is a flow chart illustrating the process flow of the time marching step of the preferred embodiment depicted in FIG. 1.

The time simulation step S30 represents a plurality of time segments or steps capturing the change in fluid flow characteristics over time. During each time step, a sequence of events or sub-steps are performed (S31–S37), as shown in FIG. 2. In the preferred embodiment, the time steps simulate the creation of vorticity at the surface of the object, the outgrowth of the vorticity through the vortex sheet layers, and the release or ejection of the vortices from the outer sheet layers into the rest of the flow domain. The origin of turbulence and vorticity, i.e., the instantaneous rotation of the fluid motion, occurs at the boundary or surface wall of the object. In accordance with the preferred embodiment, the flow and the creation of new vorticity at the boundary can be mimicked by stringing together the vortex sheets. A detailed discussion of the process flow in sub-steps S31 through S37 (FIG. 2) will be described below.

After the time simulation step S30, the resulting data produced by the process flow can be output to one or more applications in step S40. Typical outputs resulting from the process flow include data on the strength of vortex sheets, strength and location of vortex filaments, etc. The resulting data can also be visualized in step S50. Preferably, the visualization is performed using a three-dimensional visualization tool in accordance with a preferred embodiment of the invention, as will be described in detail below.

As shown in FIG. 2, the time simulation step S30 is preferably made up of a plurality of sequential sub-steps S31 through S37. The full sequence of sub-steps is performed for each time march or step made in the process of simulating fluid flow using the process flow steps S10 through S50 (FIG. 1), as described above.

The first sub-step S31 in the sequence for each time step (FIG. 2) of the simulation involves the computation of the velocity induced on every field point by every vortex element whose vorticity strength was computed from the previous time step. The field points are either the nodes of the prismatic layer grid covering solid surfaces referred to as "grid points," or the nodes of the vortex filaments referred to as "filament points." The vortex elements are either the triangular vortex sheets 430 (FIG. 4) that cover solid surfaces 400 or the vortex filaments. The velocity induced by the triangular vortex sheets on every field point must first be evaluated. The velocity, $u_{vs}=(u_{vs}, v_{vs}, w_{vs})$, induced by a single triangular vortex sheet of constant thickness, d, on a field point is given by equation (1):

$$\begin{pmatrix} u_{vs} \\ v_{vs} \\ w_{vs} \end{pmatrix} = -\frac{d}{4\pi} \int\int_S \begin{pmatrix} 0 & -(z-z') & (y-y') \\ (z-z') & 0 & -(x-x') \\ -(y-y') & (x-x') & 0 \end{pmatrix} \begin{pmatrix} \Omega_1 \\ \Omega_2 \\ \Omega_3 \end{pmatrix} \frac{dS}{\sqrt{(x-x')^2+(y-y')^2+(z-z')^2}} \quad (1)$$

where (x, y, z) are the field point coordinates, $(x^1, y^1, z^1)$ are the coordinates on the sheet surface, S, and $(\Omega_1, \Omega_2, \Omega_3)$ are the vorticity component distributions of the sheet. The integral of equation (1) is preferably computed in the following form with equation (2):

$$\begin{pmatrix} u_{vs} \\ v_{vs} \\ w_{vs} \end{pmatrix} = -\frac{d}{4\pi} \int\int_S \begin{pmatrix} 0 & z' & -y' \\ -z' & 0 & x' \\ y' & -x' & 0 \end{pmatrix} \begin{pmatrix} \Omega_1 \\ \Omega_2 \\ \Omega_3 \end{pmatrix} \frac{dx'dy'}{\sqrt{(x')^2+(y')^2+(z')^2}} \quad (2)$$

transforming it into the frame of reference where x=y=z=0 and the vortex sheet surface is parallel to the xy plane. Note that in this frame of reference z'<0 when a field point is above the vortex sheet. The sheets are assumed to have no vorticity variation across their thickness, while a piece-wise linear vorticity distribution is assumed on the sheet surface as follows from equation (3):

$$\Omega_i(x',y')=a_i x'+b_i y'+c_i \quad (3)$$

where $a_i$, $b_i$, $c_i$, i=1, 3 are constants to be determined by the value of vorticity, $\Omega_{ij}$, at the three triangle vertices, j=1, 3, where $$\Omega_{ij}=a_i x'_j+b_i y'_j+c_i 5 \quad (4)$$

In this frame of reference, the substitution x'=r cos θ, y'=r sin θ can be made and the velocity obtained in the form:

$$\begin{pmatrix} u_{vs} \\ v_{vs} \\ w_{vs} \end{pmatrix} = -\frac{d}{4\pi} \begin{pmatrix} z'(a_2 I_x + b_2 I_y + c_2 I_0) - (a_3 I_{xy} + b_3 I_{yy} + c_3 I_y) \\ -z'(a_1 I_x + b_1 I_y + c_1 I_0) + (a_3 I_{xx} + b_3 I_{xy} + c_3 I_x) \\ (a_1 I_{xy} + b_1 I_{yy} + c_1 I_y) - (a_2 I_{xx} + b_2 I_{xy} + c_2 I_x) \end{pmatrix} \quad (5)$$

where $$z'I_0 = \oint \int_0^R \frac{z'r\,dr\,d\theta}{\sqrt{r^2+z'^2}^3} = \oint \left( \frac{z'}{|z'|} - \frac{z'}{\sqrt{R^2+z'^2}} \right) d\theta \quad (6)$$

$$I_x = \oint \int_0^R \frac{r^2\cos\theta\,dr\,d\theta}{\sqrt{r^2+z'^2}^3} = \oint \left\{ \ln\left( \frac{R+\sqrt{R^2+z'^2}}{|z'|} \right) - \frac{R}{\sqrt{R^2+z'^2}} \right\} \cos\theta\,d\theta \quad (7)$$

$$I_y = \oint \int_0^R \frac{r^2\sin\theta\,dr\,d\theta}{\sqrt{r^2+z'^2}^3} = \oint \left\{ \ln\left( \frac{R+\sqrt{R^2+z'^2}}{|z'|} \right) - \frac{R}{\sqrt{R^2+z'^2}} \right\} \sin\theta\,d\theta \quad (8)$$

$$I_{xx} = \oint \int_0^R \frac{r^3\cos^2\theta\,dr\,d\theta}{\sqrt{r^2+z'^2}^3} = \oint \left( \frac{R^2+2z'^2}{\sqrt{R^2+z'^2}} - 2|z'| \right) \cos^2\theta\,d\theta \quad (9)$$

$$I_{yy} = \oint \int_0^R \frac{r^3\sin^2\theta\,dr\,d\theta}{\sqrt{r^2+z'^2}^3} = \oint \left( \frac{R^2+2z'^2}{\sqrt{R^2+z'^2}} - 2|z'| \right) \sin^2\theta\,d\theta \quad (10)$$

$$I_{xy} = \oint \int_0^R \frac{r^3\cos\theta\sin\theta\,dr\,d\theta}{\sqrt{r^2+z'^2}^3} = \oint \left( \frac{R^2+2z'^2}{\sqrt{R^2+z'^2}} - 2|z'| \right) \cos\theta\sin\theta\,d\theta \quad (11)$$

For each triangle edge, these integrals are computed after substituting $R=R_{min}/\cos(\theta_{min}-\theta)$ where $R_{min}$ is the distance of the field point from the triangle edge. The first integral is computed analytically:

$$z'I_0 = \frac{z'}{|z'|}\left( \theta + \sin^{-1}\left( \frac{|z'|\sin(\theta_{min}-\theta)}{\sqrt{R_{min}^2+z'^2}} \right) \right) \quad (12)$$

The rest of the integrals are computed numerically using integration techniques such as Simpson, Euler, Trapezoidal rule, etc. In accordance with a preferred embodiment, a special case is presented. If a field point lies on or very close to a triangle vertex or edge according to one of the following criteria:

(case 1) $R_1 \leq \epsilon$;
(case 2) $R_2 \leq \epsilon$;
(case 3) $R_3 \leq \epsilon$;
(case 4) $R_{min} \leq 0.05 \max\{R_1, R_2\}$;
(case 5) $R_{min} \leq 0.05 \max\{R_2, R_3\}$;
(case 6) $R_{min} \leq 0.05 \max\{R_3, R_1\}$,
where $\epsilon=0.03 R_{avg}$ and $R_{avg}$ is the average size of the triangle edges converging to this node.

In cases 1–3, if the field point is on or near a triangle vertex, preferably integrals $I_x$, $I_y$, $I_{xx}$, $I_{yy}$ and $I_{xy}$ are not computed on the corresponding triangles due to the cancellations by the combined effect of all triangles with the common vertex. If the field point is not on or near a triangle vertex, then $z' \neq 0$ and integrals are computed only along the opposite edge to this vertex.

In cases 4–6, if the field point is on or near a triangle edge, preferably integrals $I_x$ and $I_y$ are computed without the ln (|z'|) effect due to the cancellations by the combined effect of the two triangles with the common edge. If the field point is not on or near a triangle edge, then $z' \neq 0$ and, preferably, integrals are computed only along the opposite two edges to this edge.

The influence of all vortex sheets on a field point is obtained by adding the effect of all vortex sheets 430 in layers 2 to LYR-1. As will be discussed below, vortex sheets of layer 1 do not induce any velocity because their influence is canceled by their mirror-image vortex sheets below the surface (not shown) that enforce the well-known "no-slip"

condition on solid surfaces. Vortex sheets of layer LYR do not induce any velocity because any vorticity that reaches this level is transformed into an equivalent filament and its influence is added to the influence of the other vortex filaments as will be discussed below.

As part of the velocity computation performed in sub-step S31, the velocity induced by vortex filaments on every field point is computed by first approximating each vortex tube of each vortex filament by an equivalent point vortex located in the middle of the tube. The circulation of the point vortex is equal to the circulation of the vortex tube times the vortex tube length. Then the velocity on every field point is computed by adding the influence of all vortex tubes even the ones that were just generated on the upper layer, LYR, of the grid. In accordance with a preferred embodiment, the summation of all influences is performed using the well-known Fast Multipole Method (FMM), which is a fast summation scheme for calculating velocities induced by a large number of vortices. In accordance with a preferred embodiment, the FMM is implemented using parallel processing to increase the speed and efficiency of processing, as will be discussed below.

The velocity computations performed utilizing FMM are carried out in sub-step S32. The FMM is based on combining the velocity fields induced by collections of nearby vortices into a single local expansion, preferably, in spherical harmonics. By shifting the center of the expansion to the neighborhood of other collections of vortices, an efficient velocity field calculation can be effected. To facilitate the procedure of grouping vortons and field points, the flow domain is partitioned into cubic boxes. The number and size of these boxes, and, consequently, the number of vortons per box are parameters that control the efficiency of the FMM. In a preferred embodiment, the uniform FMM is employed, where the domain is partitioned into boxes of equal size. As discussed below, an alternative methodology, the adaptive FMM, where the domain is partitioned into boxes of differing sizes but with a predetermined maximum number of vortons and field points per box, can also be used. The partitioning of the flow domain into source boxes S and field boxes F of equal size is achieved by the following procedure:

Level 1: The entire flow domain is enclosed inside a cubic box.

Level 2: The box of level 1 is divided into, preferably, 8 boxes (2 boxes per direction, $2^3=8$) of equal size.

Level 3: Each box of the previous level is divided into the same number of boxes (e.g., 8 boxes) of equal size.

Level n: Each box of the previous level is divided into the same number of boxes (e.g., 8 boxes) of equal size.

The FMM reduces the complexity of the $O((N_v)^2)$ algorithm by using multipole source expansions to compute the influences (field expansions) of the vortons on the field points, as well as the property that these expansions can be translated. In the preferred embodiment, multipole source expansions are first used to represent the influence of vortons within each source box by a truncated series of spherical harmonics. This multipole source expansion can be thought of as the equivalent of a single vorton at the center of S whose far field influence is approximately the same as the influence of each individual vorton in S. A further reduction in computational complexity is achieved by not applying the source expansion to each individual field point in F, but instead, on a single point such as the center of F, for example. This is achieved by shifting the effect of source boxes onto field boxes via truncated expansions in spherical harmonics. Finally, the resulting field expansion centered in F can be translated to all the field points in F, using another truncated series, thus yielding the velocity at each field point. The truncation order, N, is the same for all these series, and it is the parameter that controls the accuracy of the FMM in evaluating the velocity field in comparison to the direct computation.

The above FMM procedure can be used to evaluate the influence of vortons that are well-separated from the field points. For each field point, the vortons that are well-separated are defined, for example, as the vortons that do not belong to the same box as the field point or any of the surrounding 26 boxes that have a common face/edge/vertex.

The parallel implementation of this procedure is based on the following algorithm:

(a) Distribute boxes and all necessary data (e.g., coordinates of vortons and field-points within each box) amongst the $N_p$ processors.

(b) On each processor, compute multipole source expansions at boxes S.

(c) Perform total exchange of multipole source expansion coefficients between processors.

(d) On each processor
  Compute field expansions centered in boxes F; and
  Translate field expansions centered in box F to all field points in F.

Figure 5:
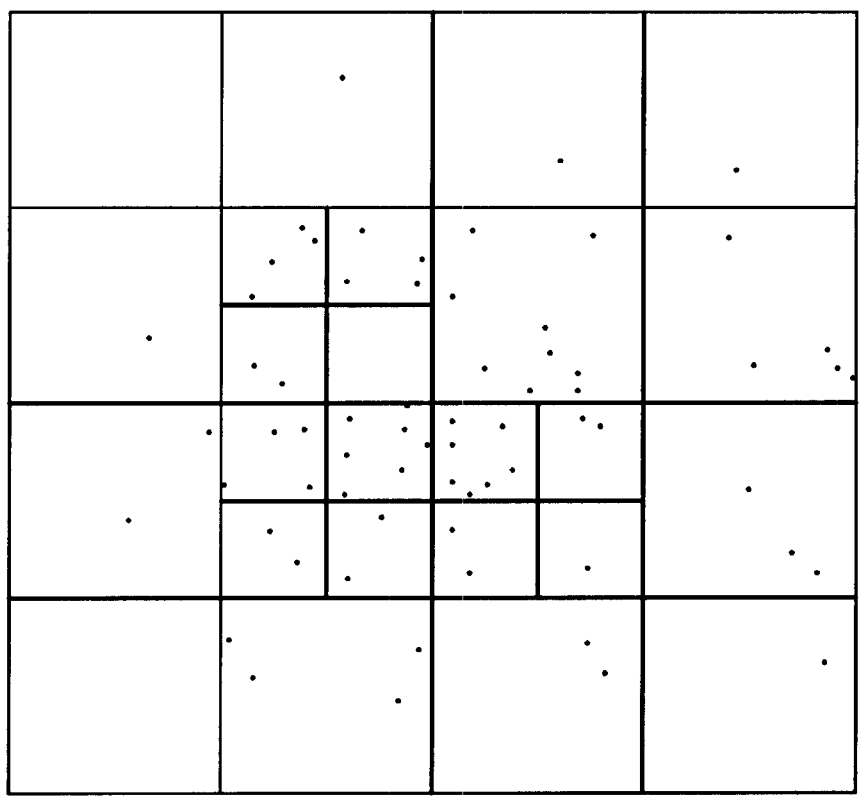
FIG. 5 depicts an adaptively partitioned collection of sub-domains of source points in accordance with a preferred embodiment of the invention.
Figure 6:
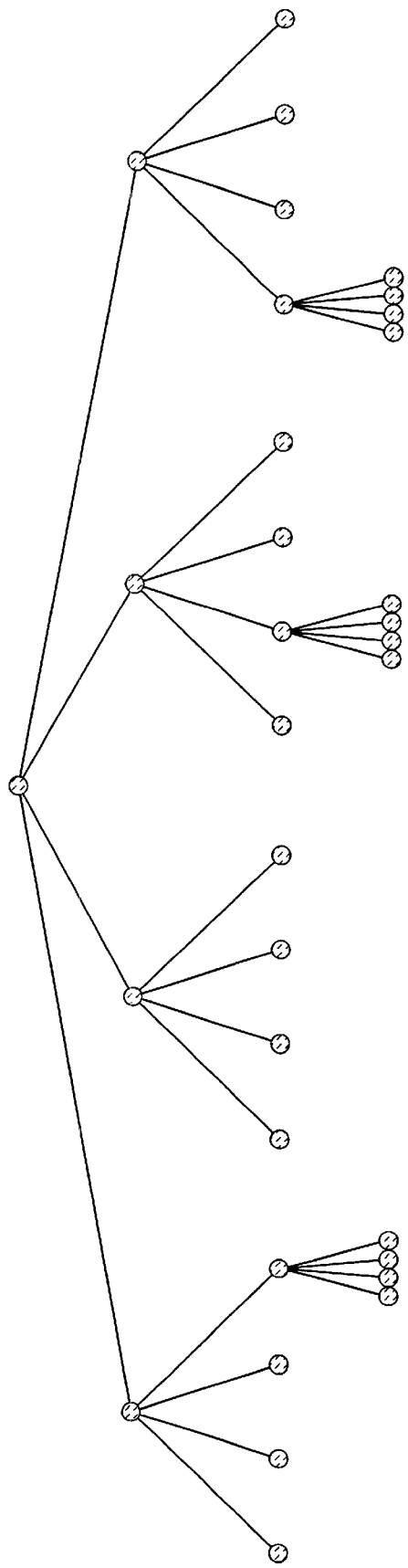
FIG. 6 depicts a hierarchical tree representation of the domain depicted in FIG. 5 in accordance with a preferred embodiment of the invention.

An alternative FMM methodology, referred to as the parallel adaptive fast multipole method, may be used in accordance with a preferred embodiment. In the adaptive method, the computational domain is partitioned into a hierarchical collection of sub-domains which is represented in a tree structure. The shape of the tree is determined by the distribution of the source points and the constraint that each of the lowest level sub-domains contain at most a predetermined maximum number of points. When a source point is introduced into the domain, and the box which contains it already has the maximum allowable number of points, then the box is sub-divided as, for example, into $2^N$ equal size child boxes, where N is the spatial dimension, and the points in the original box are re-assigned to the appropriate child boxes. This adaptation gives rise to a quad-tree in 2 dimensions, as shown in FIGS. 5 and 6 and an oct-tree in three dimensions. With this tree structure, the multipole expansions are used in a hierarchical way to reduce the complexity of the $O((N_s)^2)$ algorithm to order $O(N_s \log N_s)$, where $N_s$ is the number of source points. This approach is significantly different than the fast multipole method for the Helmholtz equation. There, FMM is used to decompose a matrix problem and the resulting parallel algorithm has different communication patterns and load balancing issues. This algorithm can be parallelized, for example, by following the Bulk Synchronous Parallel model for parallel programming as described in "Scalable Computing," Computer Science Today: Recent Trends in Developments, W. F. McColl, pages 46–61 (1995), which is herein incorporated by reference.

The adaptive FMM reduces the complexity of the $O((N_s)^2)$ algorithm by using multipole expansions to compute influences of source points on distant field points. In a preferred operation, for each leaf box (i.e., the childless boxes in the tree structure), multipole source expansions are computed. Each expansion is centered about the center of the box and represents the combined effects of all source points in that box. The expansions in all the childboxes are then translated up the tree to the center of their parent boxes. The expansions in the parent boxes represent the combined effects of all source points contained in the parent's children. This translation continues up the tree until a certain level is reached (e.g., level 2; level 0 is the root node). At level 2, all boxes at level 2 and higher (i.e., down the tree) have source expansions which account for all the source points contained in their portion of the domain. These expansions are used, when appropriate, to compute the effects of their associated source points on distant field points.

Preferably, at every field point, there is an accounting of the influence of all source points. When field points are sufficiently separated from source points, multipole source expansions are used to represent the combined effects of the source points. This is preferably done by appropriate translations of the multipole source expansions to the near-field region of the field points. The resulting expansions are referred to as the field expansions. The field expansions, then, represent the influence of distant source points. In general, these field expansions are translated to the center of field boxes, translated down the tree to the leaf boxes, and then translated to the field points themselves.

In the preferred embodiment, the field expansion computations start at level 2. First, field expansions are constructed at the center of all level 2 boxes. The criteria for which source expansions to use is preferably based on box size and separation distance, hence level, as will be described below. Next, these field expansions are translated to the child boxes at level 3. The field expansions at the level 3 boxes are added to by distant source boxes which satisfy the level 3 separation criteria but which have not already been accounted for at a previous level. This procedure continues down the tree to the leaf boxes. At the leaf boxes, the field expansions are translated to the field points themselves accounting for all distant source points. The influence of the near source points are then calculated.

In the preferred embodiment, this procedure identifies the appropriate source boxes to use for the multipole field expansions during the downward traversal of the tree. The union of all source boxes used, including source boxes of near source points, preferably covers the computational domain without overlap as each source point preferably is accounted for once and only once. The tree structure and the rules for applying the multipole expansions are used to identify these boxes. The rules are preferably based on box size and separation distance. The optimal choice of boxes will minimize the number of boxes and maximize the use of the approximations provided by the multipole expansions.

In the preferred embodiment, there are at least three conditions under which the multipole expansions are used. The conditions are preferably based on box size and separation distance and are illustrated herein for some distant source box S relative to field box F.

Under the first condition, B is any box, $\|B\|$ can be defined to be equal to the maximum dimension of any side of B. Where d (S,F) is the minimum distance between any boundary point of S and F, the source box S is well-separated from field box F if and only if $d(S,F) \geq \max(\|S\|, \|F\|)$.

For example, in FIGS. 7a–7d, the green source boxes are well-separated from the gray field boxes. When S is well separated from F, the multipole source expansion in S can be translated to the center of F and eventually used to approximate the influence of all source points in S on all field points in F Under the second condition, the separation distance is such that the multipole source expansions are valid but the translation to the center of the field box is not. For this case, the source expansion is applied directly to the field points themselves. Source box S and field box F are referred to as being source-separated in this case. Source box S is considered to be source-separated from the field box F if and only if $\|S\| < \|F\|$ and $\|S\| \leq (S,F) < \|F\|$.

For example, in the upper left panel of FIG. 4 the blue source boxes are source-separated from the gray field box.

Under the third condition the separation distance is such that the source expansions are not valid but the influence of individual source points can be added to the field expansion at the center of the field box. For this case, source box S and field box F are referred to as being field-separated. Source box S is field-separated from the field box F if and only if $\|F\| < \|S\|$ and $\|F\| \leq d(S, F) < \|S\|$.

Figure 7A:
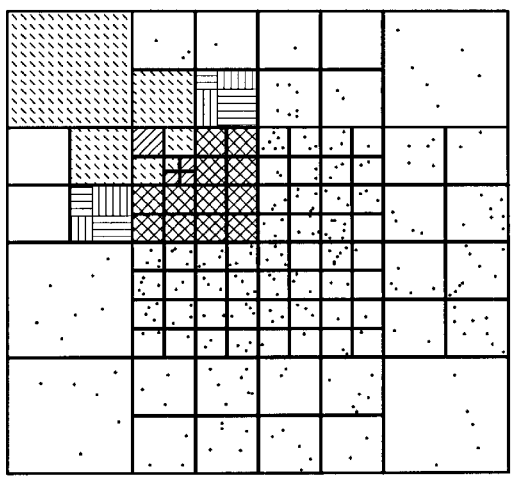
FIGS. 7a, 7b, 7c and 7d illustrate multiple levels of an adaptive partitioning of a domain of source points in accordance with a preferred embodiment of the invention.

For example, in FIG. 7a the yellow source boxes are field-separated from the gray field boxes. For each leaf field box, there is an optimal partition based on these separation rules and the requirement to minimize the number of boxes. In FIG. 7a, the optimal partition is represented by the union of the gray field box in the upper left panel, i.e., the generating leaf box, and the red, green, and yellow source boxes in all panels.

In accordance with a preferred embodiment, a partition of the computational domain is a set of boxes with non-intersecting interiors whose closed union is exactly equal to the computational domain. An optimal partition, from the perspective of the adaptive FMM algorithm, is one which minimizes the number of boxes and maximizes the use of the multipole expansions. The tree structure can be used to define many different partitions besides the most natural one given by the leaf boxes. For example, a leaf box and all its siblings can be replaced by its parent box. If F is some leaf box containing field points, then there will be an optimal partition based on separation distance from F which can be used to evaluate the influence of every source point on the field points in F. Each leaf box F in the tree structure generates an optimal partition of the domain which is needed in the adaptive FMM algorithm to compute influences.

In the described embodiment, the computational domain is decomposed into non-intersecting open sets such that rules for applying the multipole expansions apply to each set. The covering of these sets with boxes from the tree structure identifies the boxes used to apply the multipole expansions. In the discussion below, the boxes are considered to be open boxes. Closed boxes will be indicated with an over-bar mark or OB (over-bar) subscript.

The optimal partition of the computational domain generated by a leaf field box F is based on the extended colleague lists of F and of F's ancestors. The extended colleague list of F is defined as the list of all boxes adjoining F which are at the same level as F or lower. (The root box is at level 0; hence, lower level means higher up the tree; hence, a bigger box.) By definition, the boxes in the extended colleague list completely surround F unless F shares a boundary with the computational domain. For convenience, F and its ancestors are denoted by placing the box level in a superscript. For instance, if F is at level 1, then $F=F^1$ and F's parent is $F\eta$.

Where $F^1$ is the leaf field box generating the partition, $\{E_1(F^1)\}$ is the set of all boxes in the extended colleague list of $F^1$, and $\epsilon_{OB}(F^1)$ is the closed union of these boxes:

$$\bar{\epsilon}(F^1) = \bigcup_i \bar{E}_i(F^1).$$

Define a sequence of sub-domains as follows:

$$D^l(F^l) = \varepsilon(F^l) + \bar{F}^l$$

$$D^{l-1}(F^l) = \varepsilon(F^{l-1}) - \varepsilon(F^l)$$

$$D^{l-2}(F^l) = \varepsilon(F^{l-2}) - \varepsilon(F^{l-1})$$

$$\vdots$$

$$D^0(F^l) = 0.$$

Since the closure of $\varepsilon$ ($F^1$) was defined by a collection of closed boxes, each $D^i$ ($F^1$) is an open set whose interior contains the appropriate boundary points of the boxes which define it. By construction, the following relations hold:

$$\bar{D}_{OB} = \bigcup_{i=1}^{l} \bar{D}^i(F^l)$$

$$D^i(F^1) \Omega D^j(F^1) = 0, \; i \neq j$$

where D is the computational domain.

In the preferred embodiment, this decomposition forms the basis of the optimal partition of the computational domain with respect to the adaptive FMM. Preferably, the sub-domain $D^1$ ($F^1$) will be partitioned into sets of source-separated boxes and near-field boxes relative to $F^1$. The sets $D^j$ ($F^1$) for j<1 will be partitioned into sets of well-separated and field-separated boxes relative to $F^{j+1}$.

Where $A_i$ ($F^1$) is the set of all leaf boxes contiguous with $F^1$, $A_{OB}$ ($F^1$) is the closed union of these boxes:

$$\bar{A}(F^l) = \bigcup_i \bar{A}_i(F^l).$$

Define $$L^1 = \bar{F}^1 + A(F^1)$$

By construction, $L^1 \subset D^1$ ($F^1$). Also define $$L^3 = D^1(F^1) - L^1.$$

The decomposition of $D^1$ ($F^1$) given by $$D^1(F^1) = L^1 + L^3 L^1 \cap L^3 + \emptyset$$

is the desired decomposition for near-field boxes and source-separated boxes.

The covering of the sub-domain $L^1$ with boxes from the tree structure is unique. Also, because each box in the covering of $L^1$ adjoins $F^1$, the influence of all source points in $L^1$ on all field points in $F^1$ must be computed exactly. In FIG. 7a, the gray box represents $F^1$ and the red boxes are the unique covering of $L^1$.

A covering of the sub-domain $L^3$ with boxes from the tree, in general, is not unique. The possibility exists that a box B and all its siblings are contained in $L^3$. In this case, that portion of $L^3$ can be covered by the parent of box B. Using the lowest level boxes possible to cover $L^3$ gives the optimal partition. Any box in this covering will be source-separated from $F^1$. In FIG. 7a, the $L^3$ region is covered by blue boxes. In this particular example, the covering is unique. However, it could have been the case where these blue boxes are parent boxes.

The regions $L^1$ and $L^3$ are precisely the regions covered by the list 1 and list 3 boxes in Strickland and Baty, "A Three-Dimensional Fast Solver for Arbitrary Vorton Distributions," SAND93-1641 (1993), which is hereby incorporated by reference. The partition of $D^1$ ($F^1$) when j<1 is similar to the above. Let $$\{C_i^j(F^1)\} = \{B|B \text{ is a leaf box}, B \in \{E_i(F^1)\}, \text{ and } B \subset D^j(F^1)\}.$$

That is, B is a leaf box in the extended colleague list of $F^1$ which is contained in the subset $D^j$ ($F^1$). Let $C_{OB}{}^j$ ($F^1$) be the closed union of these boxes.

$$\bar{C}^j(F^l) = \bigcup_i \bar{C}_i^j(F^l).$$

Define $$L^{4,j} = C^j(F^1)$$

and $$L^{2,j} = D^j(F^1) - L^{4,j}.$$

The decomposition of $D^j$ ($F^1$), j<1 is given by $$D^j(F^1) = L^{2,j} + L^{4,j} L^{2,j} \cap L^{4,j} = 0$$

is the preferred decomposition for well-separated and field separated boxes.

The covering of the $L^{4,j}$ sub-domain with boxes from the tree is unique. Because $L^{4,j}$ is constructed from leaf boxes, they can be used as a covering. If B is any box in this covering, then it is the case that not all of B's siblings will be in the covering; hence, no collection of boxes in $L^{4,j}$ can be replaced with their parent box and so the covering is unique.

If S is any box in the covering of $L^{4,j}$ then S is a leaf box, and, because it is also in the extended colleague list of $F^j$, it must be the same size or bigger than box $F^j$. Because $$D^j(F^1) \cap D^{j+1}(F^1) = \emptyset$$

S can not be in the extended colleague list of $F^{j+1}$, hence S is separated from $F^{j+1}$ by a box the size of $F^{j+1}$. Therefore, all boxes covering $L^{4,j}$ are field-separated from $F^{j+1}$.

In FIG. 7a, $L^{4,3}$ is covered by yellow boxes and is field-separated from the gray box, $F^4$. Similarly, in FIG. 7b the yellow box covers $L^{4,2}$ and is field-separated from the gray box, $F^3$. For the particular choice of $F^4$ in FIG. 7c, the $L^{4,1}$ sub-domain is empty; hence, no yellow boxes are shown.

The $L^{2,j}$ sub-domain can be covered with boxes the same size as $F^{j+}$. Suppose $S^2 L^{2,j}$ and suppose $\|S\| > \|F^{j+1}\|$. Then, if S is a leaf node, S will be in $L^{4,j}$ and so cannot be in $L^{2,j}$. If S is not a leaf node, then descendants of S at level 1 can be used in the covering. Suppose $S^2 L^{2,j}$ and suppose $\|S\| < \|F^{j+1}\|$, then all siblings of S's must also be contained in $L^{2,j}$ and so can be replaced by their parents.

Figure 7B:
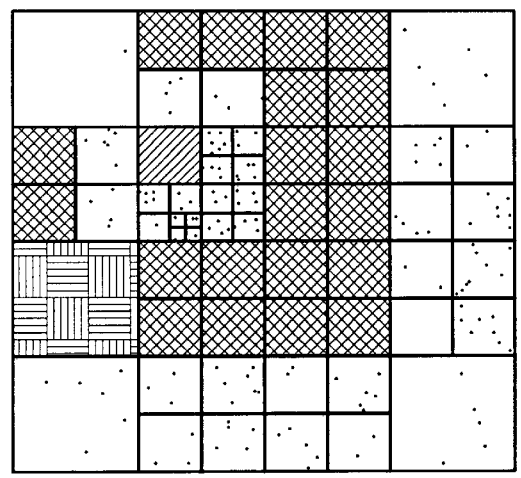
Figure 7C:
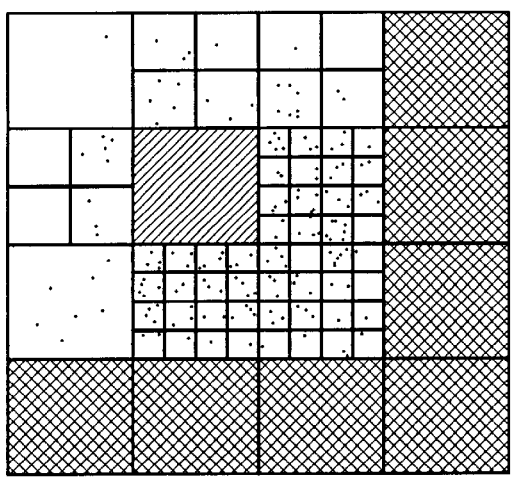
Figure 7D:
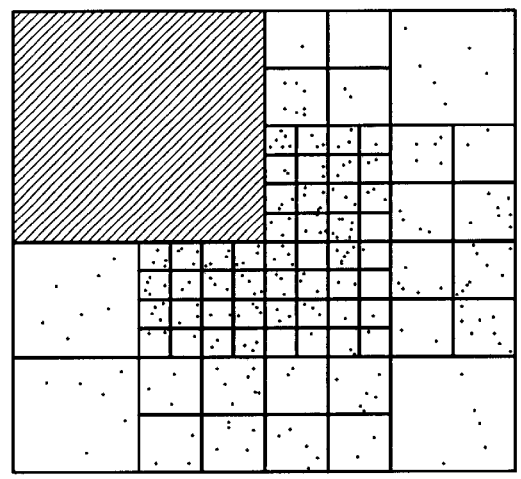
Figure 8:
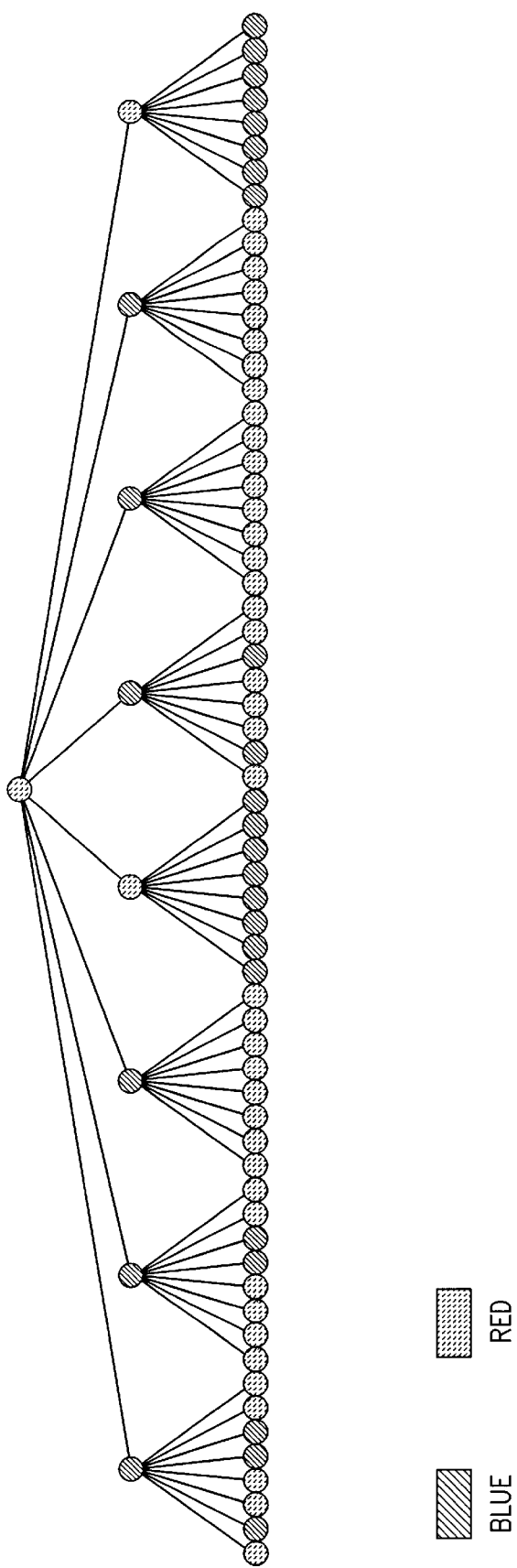
FIG. 8 illustrates the first three levels of a seven level partitioned tree of the domain depicted in FIGS. 7a–7d in accordance with a preferred embodiment of the invention.

Any box S in this non-unique covering of $L^{2,j}$ is well-separated from $F^{j+1}$. This is the optimal covering since both multipole source and field expansions can be used relative to $F^{j+1}$. In FIGS. 7a–7c the green boxes cover $L^{2,j}$.

The regions L2 and L4 are precisely the regions covered by the list 2 and list 4 boxes in Strickland and Baty, "A Three-Dimensional Fast Solver for Arbitrary Vorton Districtions," SAND93-1641 (1993), which is hereby incorporated by reference.

In summary, the partition of the computational domain based on the leaf field box F1 is a collection of non-intersecting regions given by:

$$D = L^1 + L^3 + \bigcup_{j=2}^{l}(L^{2,j} + L^{4,j}).$$

In accordance with a preferred embodiment, each leaf field box gives rise to a separate partition. This is the partitioning strategy used in the parallel adaptive fast multipole code.

The above partitioning strategy was defined from a leaf box up. The algorithm itself will construct these partitions from the top of the tree down. The higher up the tree, the more each of the partitions have in common with one another. For instance, if a sibling of the gray node in FIG. 7a were chosen instead to generate the partition, the arrangement of the boxes would be different on the first panel, but not on the subsequent panels since their ancestors are the same. That is, the partitions given by $L^{2,j}$ and $L^{4,j;\ j<4}$ will be identical; hence, the field expansions from the top down to level 3 will be identical and only need to be computed once.

In accordance with a preferred embodiment, the parallel algorithm for the adaptive fast multipole code may employ a known model such as the Bulk Synchronous Parallel (BSP) model for parallel programming. The BSP is a simple programming model based on a superstep structure. A superstep consists of either calculations or communications, or both; only one sided communications are allowed. Each superstep is followed by a barrier synchronization for all processors. The simple structure of the BSP model has some very important benefits. These include: (1) the task of debugging a message passing program is much easier; and, (2) one can, with knowledge of the complexity of the algorithm, predict how a BSP algorithm will perform on a particular machine without writing a single line of code. The adaptive FMM code has 2 supersteps: one for computing the source expansions and one for computing the field expansions and velocities. The parallel algorithm, including the details of these 2 supersteps, are described below.

When solving most n-body problems, the computational costs far exceed the memory requirements. This is true for the vortex method, even for $O(10^7)$ source points. Because of this, and because of the complexity of parallelizing the adaptive FMM code, certain simplifying assumptions are made in this illustrated embodiment. These assumptions are: (1) each processor has its own copy of the full tree; (2) a total exchange of the source expansion coefficients is done at the conclusion of the source expansion super-step. (Preferably, the field expansion coefficients may remain local to each processor to remove the need to exchange this data.) These assumptions make it easy to distribute work to the processors—only node numbers of starting nodes need to be passed to each processor to indicate its responsibility.

The parallel algorithm for computing the source expansions is:

(a) Partition the tree.
(b) Assign subtrees to processors.
(c) Source Expansion Superstep: On each processor
(1) For each sub-tree
 compute multipole source expansions at all leaf boxes; and
 translate the source expansions up to the root of the sub-tree (level $1_r(T_i)$) or to level 2 as appropriate.
(2) Do total exchange of multipole source expansion coefficients.
(d) If necessary, translate source expansions from level $1_r(T_i)$ to level 2.

Step (a) partitions the tree into a collection of sub-trees for distribution across the processors. The main objective of this step is to load balance. The original tree is pruned in such a way that the resulting sub-trees have as close as possible the same number of source points. In FIG. 5, the first 3 levels of a 7 level tree are displayed. The tree is partition into 22 sub-trees. The root node of each sub-tree is colored blue. The sub-trees are distributed to the processors in step (b) and the source expansion superstep is done in in step (c). The special sub-tree consisting of the original root node and extending down to but not including the root nodes of all other sub-trees is referred to as the root-node sub-tree. In Step (d), all processors operate on this sub-tree which results in a small amount of redundant calculations.

The number of sub-trees, $T_i$, is a function of the number of processors, the distribution of the source points, and the desired granularity. For higher granularity, many more sub-trees than processors are needed. The advantage of high granularity is load balancing is easier to achieve; however, more sub-trees means the root node of each sub-tree is further down the original tree which requires more redundant calculations at the root-node sub-tree. Once the sub-trees are identified, they can be distributed to the processors in a number of different ways: (1) a contiguous allocation based on the number of sub-trees and the number of processors, (2) a round-robin distribution, and (3) a more sophisticated technique based on solving the knapsack problem. These characteristics of the parallel algorithm can be controlled with inputs to the code.

The parallel adaptive algorithm for computing the field expansions is:

(e) Field Expansion Superstep: On Each Processor
(1) For Level 1=2 to the Level Just above the leaf nodes, do for each sub-tree
 for each non-leaf field point box $F^1$ at the current level; do
  construct list 2 and list 4 boxes relative to field box $F^1$
  compute field expansions centered in box $F^1$ from the list 2 and list 4 boxes
  translate field expansions to the children of box $F^1$.
(2) For each leaf field point box $F^1$; do
 translate field expansions centered in box $F^1$ to all field points in F1
 construct lists 1 and 3 boxes for box $F^1$
 add influences of all source points in the list 1 boxes and box $F^1$ itself to each field point in F
 add influences of the source expansions in the list 3 boxes to each field point in $F^1$
 compute velocities at the field points.
(3) Do a total exchange of velocities.

In the preferred embodiment, the algorithm for computing the field expansions starts level 2. Depending on a number of factors, there may be insufficient parallel work at this level and so some redundant calculations may have to be done. This depends on the largest level of the root node of the all the sub-trees; refer to this level as $1_{max}$. All processors start the computation at level 2 and proceed down the tree computing all field expansions until level $1_{max}$ is reached. From this point forward, only the nodes in the sub-tree are processed. If $1_{max} > 3$, then redundant calculations at the top of the tree are done. If $1max \leq 2$, then no redundant calculations are done.

The computation of the field expansions can be accomplished in one superstep. The field expansion data at the leaf boxes do not need to be communicated to their neighbors. It will be used only locally. The superstep ends with a total exchange of the velocities.

In the preferred embodiment, the influences of all the source points in D are accounted for only once. The field expansion calculations begin at level 2 and continue down the tree. In FIG. 7a, this can be seen graphically for a particular field box $F^1$ by the fact that the entire domain is ultimately covered with red, green, and blue boxes, plus $F^1$ itself. Step (1) of (e) computes the field expansions based on the green and yellow boxes while step (2) computes the influences based on the red and blue boxes, and based on the source points residing in the leaf field box itself.

| | |
|---|---|
| $N_V(S)$ | Number of source points in box S |
| s | Cartesian coordinates for the center of box S |
| $x_i = (x_i, y_i, z_i)$ | Cartesian coordinates for the ith source point in S |
| $G(S)_i$ | Vector valued strength of the ith source point in S |
| $\rho(x_i - s), \alpha(x_i - s), \beta_i(x_i - s)$ | Spherical coordinates of ith source point in S with origin at the center of S |
| $Y_j^m(\alpha(x_i - s), \beta_i(x_i - s))$ | Spherical harmonic |
| $A(s)_j^k$ | Vector valued coefficients of the expansion centered at s |
| p | Field point |
| N | Order of the expansion |

Source Expansion Coefficients

Expansion coefficients at the center of source box S due to individual source points in S are:

$$(A(s))_j^k = \sum_{i=0}^{N_V(S)} G_i(S)(\rho(x_i - s))^j Y_j^{-k}(\alpha(x_i - s), \beta(x_i - s))$$

Lemma: $A_j^k = \overline{A_j^{-k}}$ where $\overline{A_j^{-k}}$ is the complex conjugate of $A_j^{-k}$.

The lemma follows immediately from the fact that $G_i$ and $p_{j/i}$ are r $Y_j^m = \overline{Y_j^{-m}}$ Translation of source domain expansion coefficients centered at box S to the center of box P are computed by $$\tilde{A}(p)_j^k = \sum_{n=0}^{j} \sum_{m=ml}^{m=mh} \frac{Ja_n^{k-m} D_n^m D_j^k D_{j-n}^{-m} Y_{j+n}^{m-k}(\alpha(s-p), \beta(s-p))\rho(s-p)^n}{D_j^k} A(s)_{j-n}^{k-m}$$

where ml=max(-n, K-N), and mh=min(n, K+N), $$Ja_n^m = \begin{cases} (-1)^{\min(|m|,|n|)}, & \text{if } m \cdot n < 0 \\ 1 & \text{otherwise,} \end{cases}$$

$$D_n^m = \frac{(-1)^n}{\sqrt{(n-m)!(n+m)!}}$$

Lemma: $\tilde{A}_j^k = \overline{\tilde{A}_j^{-k}}$

From the definitions of $D_{m/n}$ and $Ja_{m/n}$, we have the following:

$D_n^m = D_n^{-m}$
$Ja_n^m = Ja_{-n}^{-m}$

Using this and the fact that $A_j^k = \overline{A_j^{-k}}$, it is apparent that for some integer K such that $0 \le K \le N$, $$\tilde{A}_j^{-K} = \sum_{n=0}^{j} \sum_{m=-n}^{m=-K+N} \frac{Ja_n^{-K-m} D_n^m D_j^{-K} D_{j-n}^{-K-m} Y_{j+n}^{m+K}(\alpha, \beta)\rho^n}{D_j^k} A_{j-n}^{-K-m}$$

$$= \sum_{n=0}^{j} \sum_{m=-n}^{m=-K+N} \frac{Ja_m^{-K-m} D_n^m D_j^{-K} D_{j-n}^{-K-m} Y_{j+n}^{-(m+K)}(\alpha, \beta)\rho^n}{D_j^k} A_{j-n}^{K+m}$$

$$= \sum_{n=0}^{j} \sum_{m=K-N}^{m=n} \frac{Ja_{-m}^{-K+n} D_n^{-m} D_j^{-K} D_{j-n}^{-K+m} Y_{j+n}^{m-K}(\alpha, \beta)\rho^n}{D_j^k} A_{j-n}^{K-m}$$

$$= \sum_{n=0}^{j} \sum_{m=K-N}^{m=n} \frac{Ja_m^{K-m} D_n^m D_j^K D_{j-n}^{K-m} Y_{j+n}^{m-K}(\alpha, \beta)\rho^n}{D_j^k} A_{j-n}^{K-m} = \overline{\tilde{A}_j^K}$$

A similar argument applies for negative K.

Because of the last 2 lemmas, there is only need to save the expansion coefficients with positive k indices.

Field Expansion Coefficients

The local expansion centered at some field point p due to source points in a well separated source box S is given by $$\tilde{B}(p)_j^k = \sum_{n=0}^{N} \sum_{m=0}^{n} \frac{Jab_k^{n,m} D_n^m D_j^k Y_{j+n}^{m-k}(\alpha(s-p), \beta(s-p))}{D_{j+n}^{m-k} \rho(s-p)^{j+n+1}} \tilde{A}(s)_n^m$$

$$Jab_k^{n,m} = \begin{cases} (-1)^n(-1)^{\min(|m|,|k|)}, & \text{if } m \cdot k > 0 \\ (-1)^n & \text{otherwise} \end{cases}$$

and due to $N_v$ single source points from source box S is $$(B(p))_j^k = \sum_{i=0}^{N_V(S)} \frac{G_i(S) Y_j^{-k}(\alpha(x_i - p), \beta(x_i - p))}{(\rho(x_i - p))_i^{j+1}}$$

The translation of the field point expansions from point p to point q is:

$$(\tilde{B}(q))_j^k = $$

$$\sum_{n=0}^{N} \sum_{m=0}^{n} \frac{Jb_{n-j,m-k}^m D_{n-j}^{m-k} D_j^k Y_{n-j}^{m-k}(\alpha(p-q), \beta(p-q))(\rho(p-q))^{n-j}}{D_n^m} (B(p))_n^m$$

where $$Jb_{n,m}^k = \begin{cases} (-1)^n(-1)^m, & \text{if } m \cdot k < 0 \\ (-1)^n(-1)^{k-m} & \text{if } m \cdot k > 0 \text{ and } |k| < |m| \\ (-1)^n & \text{otherwise} \end{cases}$$

Lemma: $B_j^k = \overline{B_j^{-k}}$

Lemma: $\tilde{B}_j^k = \overline{\tilde{B}_j^{-k}}$

In accordance with a preferred embodiment of the invention, the strength of the triangular surface source panels can be computed by the numerical solution of the following integral equation, which represents the no-penetration condition on solid surfaces, $$\frac{1}{4\pi} \int_S \frac{q(n \cdot r)}{r^3} dS = -n \cdot u_v \qquad (13)$$

where the left hand side is the surface normal velocity induced on the surface point (x, y, z) by a surface source strength distribution q(x', y', z'), and the right hand side is the opposite of the surface normal velocity induced by all the vortex elements of the flow. In this equation, r=(x–x', y–y', z–z') and n is the surface normal unit vector.

To facilitate the numerical solution of equation (13), the no-penetration condition is enforced at the node points of the triangularized surface and results in the following linear system of equations for the source strengths at the same node points:

$$A_{ij}q_j = -(n \cdot u_v)_i \tag{14}$$

where each element of the array $A_{ij}$ is equal to the normal velocity induced at surface node point i by a piece-wise linear source distribution with unit strength at surface node point j and zero on all other surface node points. The construction of matrix $A_{ij}$ is performed by looping over all surface triangles assuming a piece-wise linear source distribution where, in turn, each triangle vertex has unit source strength while the other two have zero, and computing the normal induced velocity on all the surface node points.

The construction and inversion of array $A_{ij}$ may be performed in the precomputation step S20 (FIG. 1) of the process. During each time step, a new right hand side is provided and the linear system is solved to provide the source panel strengths that enforce the surface no-penetration condition.

Once the source strengths are computed in sub-step S33, the velocity, $u_s$ induced by these source panels on all field points is computed and added to the velocity $u_v$ induced by all vortex elements (as computed after stages 1 and 2) to result in the total velocity field in sub-step S34.

The velocity, $u_s=(u_s, v_s, w_s)$, induced by a single triangular surface source panel on a field point is given by the equation.

$$\begin{pmatrix} u_s \\ v_s \\ w_s \end{pmatrix} = \frac{1}{4\pi} \int\!\!\int_S \begin{pmatrix} x-x' \\ y-y' \\ z-z' \end{pmatrix} \frac{QdS}{\sqrt{(x-x')^2+(y-y')^2+(z-z')^2}} \tag{15}$$

where (x, y, z) are the field point coordinates, (x', y', z') are the coordinates on the source panel surface, S, and Q is the source strength distribution of the panel. The integral of equation (15) is computed in the following form:

$$\begin{pmatrix} u_s \\ v_s \\ w_s \end{pmatrix} = -\frac{1}{4\pi} \int\!\!\int_S \begin{pmatrix} x' \\ y' \\ z' \end{pmatrix} \frac{(ax'+by'+c)dS}{\sqrt{(x')^2+(y')^2+(z')^2}} \tag{16}$$

after transforming it into the frame of reference where x=y=z=0 and the source panel surface is parallel to the xy plane, and assuming a piece-wise linear source strength distribution on the panel surface. The constants a, b, c are determined by the value of source strength, $Q_j$, at the three triangle vertices, j=1, 3, where $$Q_j = ax'_j + by'_j + c \tag{17}$$

As described above, in this frame of reference, the substitution $x_1=r\cos\theta$, $y_1=r\sin\theta$ can be made, and the velocity obtained in the form:

$$\begin{pmatrix} u_s \\ v_s \\ w_s \end{pmatrix} = -\frac{1}{4\pi} \begin{pmatrix} aI_{xx} + bI_{xy} + cI_x \\ aI_{xy} + bI_{yy} + cI_0 \\ z'(aI_x + bI_y + cI_0) \end{pmatrix} \tag{18}$$

where the integrals are as defined previously above. For efficiency reasons, the computation of induced velocities as described above is carried out for each field point and the computed velocities are then interpolated to calculate the velocity induced on filament end points which lie inside the vorticity layers. Filament end points which lie outside the vorticity layer are assigned approximate velocity field which is computed assuming that the vorticity of each surface triangle is concentrated at its center. Each time step, preferably an oct-tree-based search is executed to identify the filament points which lie inside the layer and the triangles which need to be used for interpolation.

A new value for the surface vorticity is computed by enforcing the no-slip condition on the surface node points. This is achieved by considering an explicit finite-difference approach in the following form:

$$w^{n+1} = \frac{n \times u^n}{\Delta h} \tag{19}$$

where w is the surface vorticity (first grid layer), n is the unit surface normal vector, u is the velocity induced at the second grid layer and $\Delta h$ is the second layer thickness.

Once vorticity is generated on solid surfaces, its evolution on the layer grid points is followed by solution of the vorticity equation $$\frac{\partial w}{\partial t} = \nabla \times F + \frac{1}{Re}\nabla^2 w \tag{20}$$

where F=u x w is helicity. In the preferred embodiment, an explicit scheme may be used for the solution of the vorticity equation. Thus, in sub-step S35, the derivatives of helicity on every grid point are computed using the divergence theorem on the surrounding prismatic volumes $$\frac{\partial F_i}{\partial x_j} = \frac{1}{V}\int_S F_i n_j dS \tag{21}$$

surface and V is the total volume. The total surface of each prismatic volume consists of several triangular or quadrilateral surfaces. An upwind scheme is used for the flux computation on each of these surfaces. Every surface is bounded by two triangular prisms: the "R" prism is the one towards which the surface unit normal vector, n, is directed to, while the "L" prism is the other one. For every surface, the value of $F_i$ is chosen based on the value of the normal component of the velocity field, i.e., the projection along vector n. To this purpose, $u_R$ is defined as the normal component of the velocity at the centroid of the "R" prism, while $u_L$ is defined at the centroid of the "L" prism. Then, the appropriate $F_i$ value is chosen based on the following criterion:

$$F_i = \begin{cases} F_i^L & \text{if } u_L \geq 0 \text{ and } u_L + u_R \geq 0 \\ F_i^C & \text{if } u_L < 0 \text{ and } u_R > 0 \\ F_i^R & \text{otherwise} \end{cases}$$

where $F_i^R$ is the value of $F_i$ at the centroid of prism "R", $F_i^C$ is the value of the $F_i$ at the surface itself, and $F_i^L$ is the value of $F_i$ at the centroid of prism "L".

A similar approach can be used for the diffusion term, although for high Reynolds number flows only the wall normal diffusion term is retained and computed by a finite-difference scheme.

In accordance with a preferred embodiment of the invention, new vortex tubes are created in sub-step S36 out of the vorticity residing in the outermost layer of the triangular prisms in the mesh surrounding solid bodies (FIG. 4). The algorithm precedes as follows: Assume that the vorticity in the outer layer of the prisms has been set to zero at the beginning of a time step. Then, after solution of the finite volume approximation to the vorticity equation, new vorticity appears in the top layer of triangular prisms, say $\Omega_i$ in the ith prism. If the vorticity held in the ith prism exceeds a critical value, say "vrt-thrhld," i.e., $|\Omega_i|$>vrt-thrhld, then either this vorticity is used to create a new vorton at this location, or else it is added in to a pre-existing vorton which was created at this location during an earlier time step. If the vorticity magnitude falls below the threshold no contribution to the vorton population is made from this location during the time step.

A completely new vorton may be added if either there has not recently been a preexisting vorton at this location, i.e., during the previous time step $|\Omega_i|$ was below the threshold, or else a pre-existing vorton at this location has just been "released," i.e., set free to join the general population of vortons so that it is no longer associated with its birth location. Pre-existing vortons are "released" for at least three different reasons:

1. their strength exceeds a criterion "max-crcltn,"
2. they have convected too far away from the center of the prism from which they originated (the distance is set to be equal to the average size of the sides of the triangle associated with the prism), or
3. $|\Omega_i|$ drops below the threshold for new vortons during a time step.

If a new vorton is to be added, it is preferable that it be specified at least according to its position in space, its strength, i.e., circulation, its orientation and its length. If the vorticity at a location is to be added to a pre-existing vorton, then the position, strength, orientation and length should be specified for the combined vorton.

New vortons are introduced at the center of the ith triangular prism. They are oriented in the direction of the vorticity field they are to represent. If $\Delta s$ represents the length of the new vorton, $\Gamma$ denotes its circulation and $V_i$ represents the volume of the ith triangular prism, then we must have $$\Omega_i |V_i = \Gamma \Delta_s^{10}. \tag{22}$$

This guarantees that the triangular prism and the vorton replacing it, will have the same far field velocities.

According to equation (22), only the product of vorton length and circulation must be specified, not each individually. In accordance with a preferred embodiment, a procedure has been developed to first select $\Delta s$ and then pick $\Gamma$ so as to satisfy equation (22). The vorton length is determined as the minimum of either the average length of the sides of the triangle associated with the ith prism, or the distance along the line between the top and bottom surface of the triangular prism where they are intersected by a line through the center of the prism in the direction of the vorticity.

If the new vorticity is to be added to a pre-existing vorton, (i.e., a vorton that has been created earlier at this location but has not yet satisfied the release criteria), then the following procedure may be followed: The new circulation of the vorton is taken to be the sum of the pre-existing circulation plus the new circulation determined from ( ). The new position of the endpoints of the vorton are found by taking a weighted average of the end positions of the new and pre-existing vortons, with the weighting done according to the circulation of the new and pre-existing vortons. Specifically, $(x_1; y_1; z_1)$ and $(x_2; y_2; z_2)$ represent the beginning and end points, respectively, of the pre-existing vorton, and $(a_1; b_1; c_1)$ and $(a_2; b_2; c_2)$ the similar points for the new vorton. Then the position of the pre-existing vorton is modified as follows:

$$x_j = (1-\alpha)x_j + \alpha a_j$$
$$y_j = (1-\alpha)y_j + \alpha b_j$$
$$z_j = (1-\alpha)z_j + \alpha c_j \tag{23}$$

where j=1, 2 and $\alpha = \Gamma_{new}/\Gamma_{old}$.

At every time step, the velocities at the locations of the end points of all vortons are calculated, and new updated positions of the vortons are found via a simple Euler scheme in sub-step S37. Specifically, if xn represents the endpoint of one of the vortons at the start of the nth time step of the calculation, then $$x^{n+1} = x^n + u^n \Delta t \tag{24}$$

gives the new position of the vorton end point. Here $u_n$ is the velocity field calculated at the point $x^n$ at the nth time step. Alternative schemes for the time advancement of the vorton end points may be implemented, for example, schemes with greater accuracy. As the result of the convection motions described above, vortons will tend to change in length. If an individual vorton grows in length beyond a certain threshold, then it is divided into two separate vortons of equal length. The two new vortons share a common point at the computed midpoint of the two end points of the original vorton. If a particular vorton reduces in length to a size falling below a threshold then it is combined with one or the other adjacent vortons in the filament.

To model viscous diffusion as it effects vortex tubes in the calculation, the following method has been implemented in accordance with a preferred embodiment: Let $r_e$ denote the equilibrium radius for vortex tubes with a Gaussian core in which the effects of vortex stretching are in equilibrium with viscous diffusion. For a tube whose length increases from $\Delta s$ to $\Delta s'$ in time $\Delta t$ it may be shown that $$r_e = 2\sqrt{\frac{\Delta t}{R_e(\Delta s'/\Delta s - 1)}} \tag{25}$$

where $R_e$ is the Reynolds number.

For each individual vortex tube at each time step, an estimate of the local stretching ratio $\Delta s'/\Delta s$ is made by averaging over the stretching felt by each of the vortons composing the vortex tube. This average is used to get a value of $r_e$ pertaining to the vortex filament. The actual radii of the vortex filaments used in Vorcat, r are the same constant value for all vortices. For any one tube the computed value of $r_e$ may be larger or smaller than $r_*$. If $r^* > r_e$, for the given amount of stretching experienced by the vortex tube, then its equilibrium radius is smaller than the actual radius it has in the computation. Hence, if given the opportunity, the vorton will tend to get thinner. On the other hand, if $r^* < r_e$, the vortex is not experiencing enough stretching to justify its radius, and if given the opportunity it will diffuse outward and become larger.

In accordance with the preferred embodiment of the invention, these differing conditions are modeled by the following mechanism: If $r^* < r_e$, a loss of circulation from a tube is implied. The amount lost is determined by the extent to which vorticity would diffuse beyond $r^*$ due to the imbalance of vortex stretching and diffusion. The necessary relation is $$\Gamma^{n+1} = \Gamma^n \left(1 - \frac{4\Delta t}{R_e}\left(\frac{1}{r^2} - \frac{1}{r_e^2}\right)\right) \tag{26}$$

where $\theta^n$ is the circulation at time n. If $r^* > r_e$, the circulation is left the same, i.e., $$\theta^{n+1} = \Gamma^n, \tag{27}$$

and if the tube faces a net contraction, i.e. if $\Delta s' < \Delta s$, then the maximum circulation loss is assessed, namely $$\Gamma^{n+1} = \Gamma^n \left(1 - \frac{4\Delta t}{R_e}\frac{1}{r^2}\right). \tag{28}$$

As vortex filaments and their component vortons evolve during the calculation, at least two techniques to limit the development of small scale flow features may be used. These are the processes of hairpin removal and vortex reconnection.

Where $s_i$ denotes the vector connecting the end points of the ith vorton, and two adjacent vortons $s_1$ and $s_2$ are lying on the same filament, the angle $\theta$ formed between these adjacent vortons can be obtained from the identity $$\cos\theta = \frac{s_1 \cdot s_2}{|s_1||s_2|}. \tag{29}$$

When $\theta$ is in the vicinity of $\pi$, the filament has a discernible kink, fold or "hairpin" at the point between the two vortons. In accordance with a preferred embodiment, such "hairpin" configurations are removed from the filaments when $\cos\theta$ falls in magnitude below a threshold, e.g., $\cos\theta^*$ where $\theta^*$ is an angle near $\pi$. The hairpin is removed by replacing the two vortons by a single straight vorton connecting the outer end-points of the original vortons.

Figure 9A:
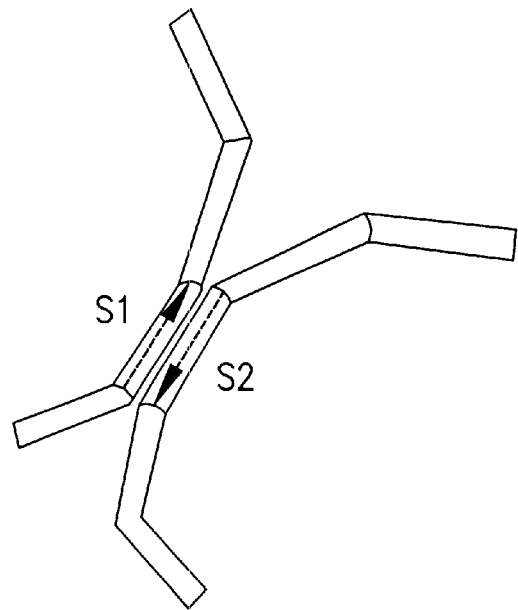
FIGS. 9a and 9b illustrate a vortex reconnection procedure in accordance with a preferred embodiment of the invention.
Figure 9B:
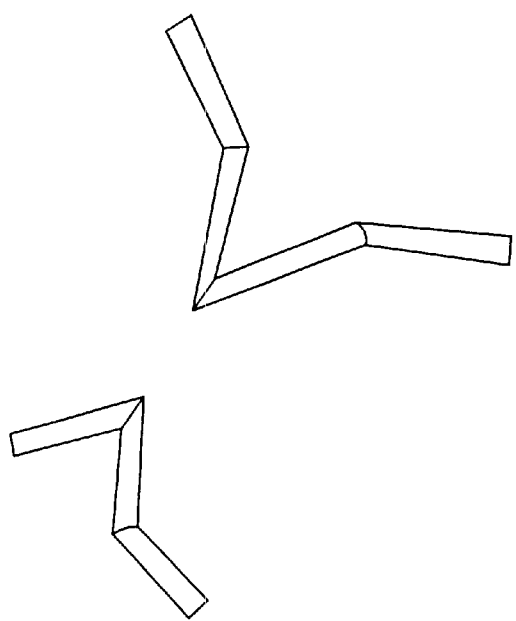

Vortex "reconnection" pertains to the situation when two nearby vortons, for example, say $s_1$ and $s_2$, belonging to different filaments with very similar circulations, have nearly equal and opposite rotation, i.e., $s_1$, is approximately antiparallel to $s_2$. In this case, the rearrangement of vortons and filaments as shown in FIGS. 9a and 9b. This procedure will allow a single vortex ring to split into two separate rings, or allow two separate rings become one ring. In accordance with a preferred embodiment of the invention, vortex filaments are not constrained to be in the form of rings, so vortex reconnection acts to cause the merger or separation of individual filaments.

Similarly, in accordance with a preferred embodiment, vortex reconnection may also be implemented as follows: The circulations of two vortons from different filaments are deemed to be within a certain percentage of each other (e.g., 10%). Then, letting $x_1$ and $x_2$ denote the center points of the vortons $s_1$ and $s_2$, respectively, $x_{12} = x_2 - x_1$ is the vector connecting the centers of the two vortons. An estimate of the distance, (e.g., d) between the vortons is made which allows the decision to be made as to whether vortex reconnection between these two vortons should be pursued.

d is determined as the average distance $$d = \frac{d_1 + d_2}{2},$$

$$d = \frac{d_1 + d_2}{2}, \tag{30}$$

where $d_1$ is the length of the vector $x_{12}$ projected onto the direction of a vector perpendicular to $s_2$ and passing through $x_1$, while $d_2$ is the length of the vector $x_{12}$ projected onto the direction of a vector perpendicular to $s_1$ and passing through $x_2$.

When d is less than a threshold value, e.g., half the radius of a vorton, then the angle between the two vortons is computed using equation (29), as in the case of hairpin removal. If this angle is close enough to ss then the vortons are considered to be anti-parallel, and then the vortex reconnection shown in the figures is implemented.

In accordance with a preferred embodiment, at least two different methods can be implemented for modeling the process by which vortices reach the end of their useful existence in the calculation:

1. During each time step of the calculation, if, as a result of subdivisions taking place since its creation, the number of vortons composing a particular tube exceeds a critical number, then that vortex tube and all of its component vortons are eliminated from the computation.

2. During each time step of the calculation, if, as a result of the diffusion model described above, the circulation of a tube falls below a specified value, then that vortex tube and all of its component vortons are eliminated from the computation.

Vortex tubes that have been released from vortex sheets sometimes move back into the vortex sheet layer. For these tubes, the vortex method described above may not accurately evaluate the velocity. As a result, in accordance with a preferred embodiment, the velocity of the re-entered tube is determined through interpolation from the surrounding triangular vertices. As the velocities on the edges of the prismatic grid in which the re-entered tube is located are already known, this interpolation can yield a very accurate reading of the velocity of the re-entered vortex tube.

In order to accurately evaluate the velocity, however, the re-entered vortex tube must be precisely located within the vortex sheet layers. Accordingly, a search mechanism such as the well-known oct-tree is utilized. In the preferred embodiment, the oct-tree is used to search the layered sheets to locate the re-entered tube. Once the prism that contains the re-entered tube is found, the interpolation calculation can be performed.

Figure 3:
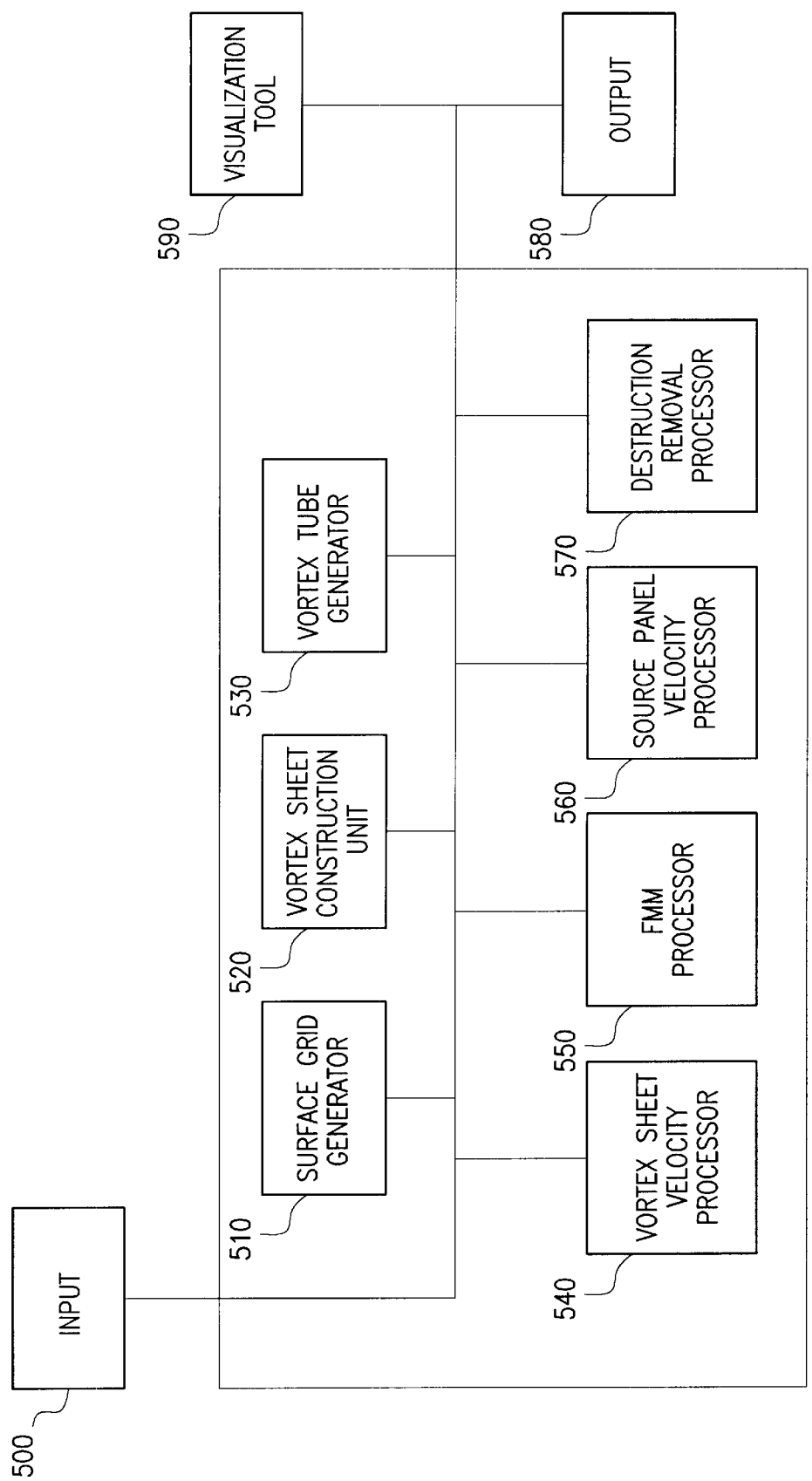
FIG. 3 is a block diagram of a computer system in accordance with a preferred embodiment of the invention.

The process flow depicted in FIG. 1 may be implemented in computer hardware, software, or both. As shown in FIG. 3, an exemplary computer system is provided having a plurality of modules for performing the various functions depicted and described above in connection with FIGS. 1 and 2. The computer system, for example, includes input device 500 for entering the geometry and parameter input information (e.g., Reynolds number, angle of attack, preferred number of layers in vortex sheet, etc.) needed to ensure the accurate and efficient operation of the simulation. The input device may be an input file reader, graphical user interface, keyboard, or any other known mechanism for inputting data or information. Among other things, the input information is used by surface grid generator 510 and vortex sheet construction unit 520 to model the geometric shape of the object and develop its prismatic grid.

Vortex tube generator 530 models the vorticity created at the surface of the object and tracks its growth outward through the different vortex sheet layers until it becomes a vortex tube released from the upper vortex sheet layer into the remaining fluid flow. The vortex sheet velocity processor 540, FMM processor 550 and source panel velocity processor 560 operate to compute the velocity and vorticity of field points throughout the flow domain taking into account the various influences described above. A filament destruction/removal processor 570 is provided to eliminate wasteful computations (e.g., performing hairpin removal, vortex destruction, etc.) made on vortices not having significant impact on the calculations of the field point velocities, as described above. Output and visualization tools 580, 590, respectively, are provided to facilitate use of the resulting data produced by the simulation of fluid flow in accordance with a preferred embodiment of the invention.

Visualization tool 590 is preferably embodied as software forming a part of (or operating in conjunction with) the turbulence simulation computer system. Visualization tool 590 may also be implemented, however, as part of a separate computer system or computer hardware. To the extent needed, the tool will receive from the simulation computer system (or independently calculate) data structures needed to display the simulation results. For example, the tool utilizes certain configuration data regarding the underlying geometry of the object and the vortex sheets (e.g., mappings of the object geometry to associated triangles; computed normal, velocity, and vorticity of each vertex; calculation of surface normals; etc.). Typically, the collection of vortons simulated are encapsulated into a layer. The visualization tool 590 utilizes data on the velocity and vorticity at the two vertices of each vorton in the vorton layer, and determines if penetration into any of the solid surfaces of the object has been made by the vortons.

Visualization tool 590 preferably renders data from the simulation in three-dimensions using different color (or gray-scaling) schemes. The surface primitives (e.g., space-filling objects such as triangles) have vertices that are distinguishable in terms of velocity, vorticity, etc. by color or gray-scale. Aesthetic parameters such as shininess and ambience may be preset or user configurable. In the preferred embodiment, the vortons are rendered as lighted geometrical constructs (e.g., cylinders). The size and shape may be scaled in proportion to given data output from the simulation. For example, the radius of a rendered cylinder may be scaled according to a representative body size. The constructs are preferably organized in an octree (or other) data structure to improve rendering performance. Various parameters of the constructs such as spin and magnitude may be visualized with use of color (or gray-scale) schemes. As another example, parameters such as velocity and vorticity may be represented as scaled, normalized vectors with cone-shaped arrowheads.

In a preferred embodiment, the user interface for the visualization tool 590 is Tcl/Tk-based with pull-down menus to toggle visualization options. Each layer, along with velocity and vorticity, for example, can be toggled on/off.

The interface permits selective rendering through input of threshold values used to filter out data not meeting the input thresholds, or through the selection of elements on the display. For example, the user may wish to visualize only those vortons whose strength exceeds a given value, or the user may simply select or highlight vorton or body layers to receive detailed information regarding the selected layers.

It should be readily understood that the components depicted in FIG. 3 may be fully or partially combined into one or more different processing units. The functionality of each component may be easily implemented separately or in various component combinations in one or more general purpose computers executing specific computer software or algorithms. Moreover, the invention may be embodied as an article of manufacture in one or more computer programs stored on one or more recording mediums (e.g., floppy or optical disk, read access memory (RAM), read only memory (ROM), disk drive, etc.).

While the invention has been described in detail in connection with the best mode of the invention currently known, it should be readily understood that the invention is not limited to the specified embodiments described herein. Rather, the invention can be modified to incorporate any number of variations, alterations, substitutions or equivalent arrangements not heretofore described, which are commensurate with the spirit and scope of the invention. For example, although no specific object was described herein as serving as the surface structure upon which turbulence was simulated, it should be recognized that any size, shape, or construct would suffice such as a prolate spheroid, cylinder, etc. The object used in the preferred embodiment is merely a generic representation of the infinite variety of structures that may be the subject of analysis (e.g., airplane wings, rotors, cabins, automobile exteriors, interiors, engine components, etc.). The fluid disclosed may be liquid, gas, chemical mixture, energy, or any process flow subject to evaluation.

The computer system described herein may be centrally located, or remotely distributed over a network of processing units. The computer system described in the preferred embodiment is merely representative of the multitude of systems which may find use for the invention. For example, the computer system may be part of an automobile design system used to analyze external aerodynamics of drag forces, noise generation, cross wind stability, etc., during development of new automotive shapes.

Although the detailed description herein has focused on the simulation of turbulence using three-dimensional modeling, it should be readily apparent to those skilled in the art that the invention may similarly be embodied in a system or algorithm utilizing only two-dimensions.

What is claimed as new and desired to be protected by Letters Patent of the United States is:

1. An apparatus for visually simulating on a display device, during successive time steps, a turbulent flow of a fluid relative to an object, the apparatus comprising:

modeling means for defining a model of the surfaces of the object;

layering means for defining a plurality of vortex sheet layers surrounding the surfaces of the object;

vortex tube tracking means for defining a plurality of vortex tubes growing out of an outermost layer of the plurality of vortex sheet layers relative to the surfaces of the object; and visualization means for visualizing the object, the layered vortex sheets, and the vortex tubes during successive time steps.

2. The apparatus for visually simulating on a display device as recited in claim 1, wherein said modeling means defines a three-dimensional model of solid surfaces of the object; and wherein said layering means further comprises a surface grid generator means for forming the vortex sheet layers by defining a mesh of triangular-shaped space filling elements stacked over each other beginning with a surface triangle layer overlaying the surfaces of the object.

3. The apparatus for visually simulating on a display device as recited in claim 1, further comprising:

grid means for constructing a layer grid of the plurality of vortex sheet layers by taking wall-normal lines at the vertices of the surface triangles, defining grid points on the wall-normal lines, and connecting the grid points so as to generate a prismatic grid;

vortex tube tracking means for defining a plurality of vortex tubes growing out of an outermost layer of said plurality of vortex sheet layers relative to the surfaces of the object;

first field point calculating means for calculating velocity induced by each vortex sheet on all of the grid points and all points making up said plurality of vortex tubes;

second field point calculating means for calculating velocity induced by each vortex tube on all of the grid points and all of points on said plurality of vortex tubes; and summation means for summing all resulting calculations from said first and second field point calculating means using a Fast Multipole Method (FMM) algorithm, where said FMM algorithm is implemented using parallel processing.

4. The apparatus of claim 3, wherein said summation means takes the resulting calculations made by said first field point calculating means for all the vortex sheet layers overlaying the surface triangle layer.

5. The apparatus of claim 3, wherein said layering means further defines a subsurface vortex sheet layer below the surfaces of the object so as to enforce a no-slip condition on the solid surfaces of the object.

6. The apparatus of claim 3, wherein said summation means employs an adaptive FMM algorithm in which each vortex to be evaluated is partitioned into a hierarchical collection of sub-domains represented in a tree structure, for each field point introduced into the tree.

7. The apparatus of claim 1, wherein said visualization means provides three-dimensional rendering of selected vortical elements, wherein detailed information is provided regarding only the vortical elements selected.

* * * * *